(12) United States Patent
Morris et al.

(10) Patent No.: US 10,734,701 B2
(45) Date of Patent: Aug. 4, 2020

(54) THROUGH GLASS INTEGRATED ANTENNA

(71) Applicant: Danlaw, Inc., Novi, MI (US)

(72) Inventors: Tim Morris, Plymouth, MI (US); Scott Morell, Milford, MI (US); Craig Matthews, Highland, MI (US); Krishna Bandi, Farmington Hills, MI (US)

(73) Assignee: DANLAW, INC., Novi, MI (US)

( * ) Notice: Subject to any disclaimer, the term of this patent is extended or adjusted under 35 U.S.C. 154(b) by 43 days.

(21) Appl. No.: 15/474,633

(22) Filed: Mar. 30, 2017

(65) Prior Publication Data

US 2017/0346156 A1 Nov. 30, 2017

Related U.S. Application Data

(63) Continuation-in-part of application No. 15/299,102, filed on Oct. 20, 2016.

(Continued)

(51) Int. Cl.
*H01Q 1/12* (2006.01)
*H01P 5/00* (2006.01)
(Continued)

(52) U.S. Cl.
CPC ............. *H01Q 1/1285* (2013.01); *H01P 5/00* (2013.01); *H01P 5/12* (2013.01); *H01Q 1/1271* (2013.01);
(Continued)

(58) Field of Classification Search
CPC .................. H01P 5/00–02; H01P 5/12; H01Q 1/1271–1285; H01Q 9/0435; H01Q 5/357; H04B 5/0012
See application file for complete search history.

(56) References Cited

U.S. PATENT DOCUMENTS 5,557,290 A * 9/1996 Watanabe ............ H01Q 1/1285
343/713
5,619,214 A * 4/1997 Lindenmeier ........ H01Q 1/1285
343/713
(Continued)

FOREIGN PATENT DOCUMENTS

CN 201087786 A 6/2011
CN 20428162 U 6/2016
(Continued)

OTHER PUBLICATIONS

European International Search Report for International Application No. PCT/US2017/034345, dated Aug. 1, 2017.
(Continued)

*Primary Examiner* — Ricardo I Magallanes
(74) *Attorney, Agent, or Firm* — Dickinson Wright PLLC

(57) ABSTRACT

A system for radio frequency transmission through a window is provided. The system may include a first wireless coupler, a second wireless coupler, and one or more antennas. The first wireless coupler may be attached to a first side of the window and configured to transmit or receive radio frequency signals. The second wireless coupler attached to a second side of the window and aligned with the first wireless coupler. The first wireless coupler may be configured to transmit or receive the radio frequency signals from the first wireless coupler to the second wireless coupler through the window. The one or more antennas may be electrically connected to the second wireless coupler. One or more radios may transmit or receive the radio frequency signals to or from the one or more antennas.

19 Claims, 16 Drawing Sheets

Related U.S. Application Data

(60) Provisional application No. 62/342,362, filed on May 27, 2016.

(51) Int. Cl.
  *H01Q 1/32* (2006.01)
  *H01P 5/12* (2006.01)
  *H04B 5/00* (2006.01)

(52) U.S. Cl.
  CPC ......... *H01Q 1/3275* (2013.01); *H01Q 1/3283* (2013.01); *H04B 5/0012* (2013.01)

(56) References Cited

U.S. PATENT DOCUMENTS

| | | |
|---|---|---|
| 6,337,622 B1 | 1/2002 | Sugano |
| 6,661,386 B1 | 12/2003 | Petros et al. |
| 6,753,773 B2 | 6/2004 | Mizuno |
| 6,933,891 B2 * | 8/2005 | Lange .................. H01Q 1/007 |
| | | 343/700 MS |
| 9,035,834 B2 | 5/2015 | French et al. |
| 9,118,114 B2 | 8/2015 | Kagaya et al. |
| 10,381,704 B2 * | 8/2019 | Talty ....................... H01P 3/003 |
| 2002/0060646 A1 * | 5/2002 | Petros .................. H01Q 1/1285 |
| | | 343/713 |
| 2004/0203390 A1 | 10/2004 | Inoue |
| 2008/0246673 A1 | 10/2008 | Kagaya et al. |
| 2010/0234071 A1 | 9/2010 | Shabtay et al. |
| 2011/0111700 A1 | 5/2011 | Hackett |
| 2011/0140975 A1 | 6/2011 | Shigetomi |

FOREIGN PATENT DOCUMENTS

| | | |
|---|---|---|
| JP | 2004128940 A | 4/2004 |
| JP | 200432014 A | 11/2004 |

OTHER PUBLICATIONS

European International Search Report for International Application No. PCT/US2017/034344, dated Aug. 7, 2017.

* cited by examiner

THROUGH GLASS INTEGRATED ANTENNA

CROSS REFERENCE TO RELATED APPLICATIONS

This application is a continuation-in-part of U.S. patent application Ser. No. 15/299,102 filed Oct. 20, 2016, which claims the benefit of U.S. Provisional Patent Application No. 62/342,362 filed May 27, 2016, the contents of which are hereby incorporated by reference in their entirety.

FIELD

The present disclosure relates to vehicle communication system that communicates a signal through a vehicle window.

BACKGROUND

The statements in this section merely provide background information related to the present disclosure and may not constitute prior art.

For the best system performance, current state-of-the-art DSRC systems use a roof mounted antenna and achieve excellent communication robustness. However, a roof mounted antenna would require drilling holes to make the connections for the existing aftermarket vehicles. Some solutions may use antennas mounted internally within the vehicle, for example to the window. However, internal antenna performance is limited and decreased because of the vehicle's pillars and roof interference.

SUMMARY

Drilling holes to route cables from outside to inside the vehicle to the DSRC ECU may be undesirable due to sealing, aesthetics and cable losses. Through the glass coupling can provide access to an external mounted antenna. The antenna design for through the glass coupling may use a stub/monopole antenna type for DSRC frequencies designed to mount on the exterior front/rear/side windshields.

A though glass antenna design is beneficial for promoting Vehicle to Everything (V2X) communications especially for aftermarket vehicles without drilling holes in vehicles and without increasing cable losses. The glass antenna system may include an internal and external coupler on opposite sides of the windshield. The internal and external couplers may be align with one another and used to transmit radio frequency (RF) signals though the windshield. The couplers be placed on front, rear, or side windows. The coupler assembly may have design elements such as circuit board, dielectric substrate, base, insulator, foam, amplifier, filter etc. The internal and external wireless coupler assemblies may include a connector to which a transmission medium (e.g. coaxial cable) may be connected to carry electromagnetic signals between coupler and the antenna.

BRIEF DESCRIPTION OF THE DRAWINGS

Further details of the disclosure are described in more detail with reference to the drawings, in which.

DETAILED DESCRIPTION

Figure 1:
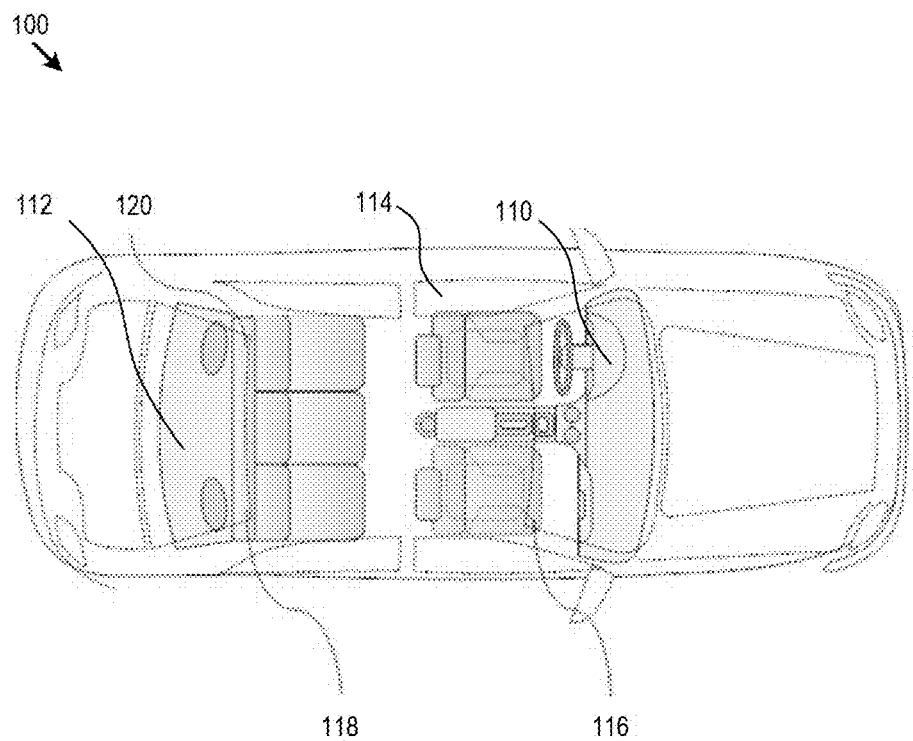
FIG. 1 is a top view of a vehicle illustrating antenna placement for a vehicle communication system.

The following description is merely exemplary in nature and is not intended to limit the present disclosure, application, or uses. It should be understood that throughout the drawings, corresponding reference numerals indicate like or corresponding parts and features.

A system for radio frequency transmission of a radio frequency signal through a window of a vehicle is provided. The window may be made of glass, polycarbonate, or other material. The system may include a transceiver. The transceiver may be configured to generate a radio frequency signal between the range of 5.70 and 5.95 GHz. The signal may be for a variety of applications including Vehicle to Vehicle (V2V), Vehicle to Infrastructure (V2I), Vehicle to Pedestrian (V2P), Vehicle to Cloud (V2C) or in simple for Vehicle to Everything (V2X) communication, for example for safety applications.

Figure 2:
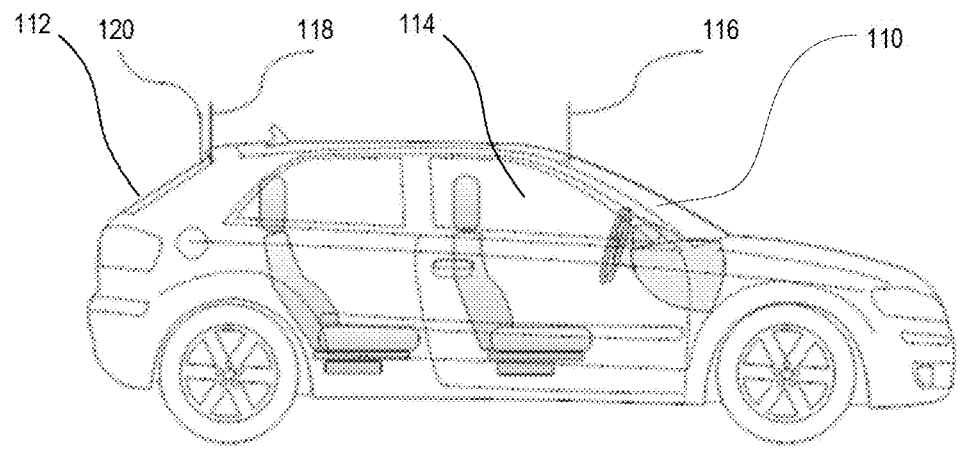
FIG. 2 is a side view of the vehicle from FIG. 1 illustrating antenna placement for the vehicle communication system.

FIG. 1 is a top view of a vehicle illustrating antenna placement for a vehicle communication system. The antennas may be place on the front windshield 110 or on the rear windshield 112. The antennas may use through the glass coupling, as described elsewhere in this application. FIG. 2 is a side view of the vehicle from FIG. 1 illustrating antenna placement for the vehicle communication system. In some implementations, antennas may be placed on a side window 114, using through glass coupling through the side window. In one implementation, an antenna 116 may be located along the center of the vehicle, for example on the front windshield. In some implementations, an antenna 118 may be located on the left side of the vehicle, while an antenna 120 may be located on the right side of the vehicle. For example, antennas 118 and 120 may be located on the rear windshield. Each of the antennas in FIGS. 1 and 2, as well as, corresponding antennas (e.g. stub, monopole, dipole antennas) discussed below in other figures may be mounted (e.g. to the second wireless coupler or the window) using a pivoting mechanism such as a swivel. The pivoting mechanism allowing the antenna to be adjusted such that the antenna is oriented along the vertical axis of the vehicle (e.g. substantially perpendicular to the lateral and longitudinal axes of the vehicle). The pivoting mechanism may include a lock such that the angle of the antenna may be adjusted manually and locked into place.

Figure 3:
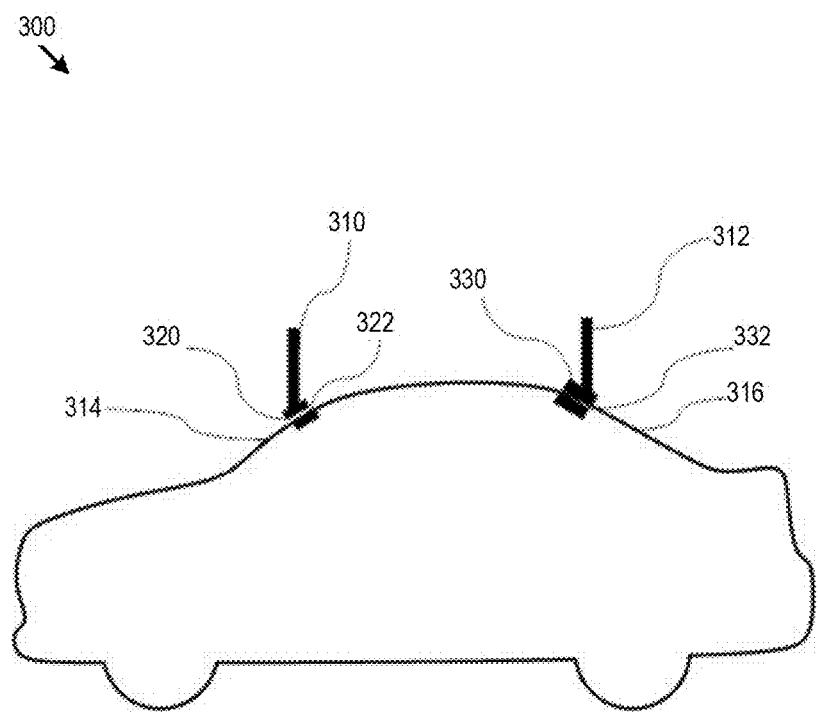
FIG. 3 is a side view of a through glass antenna system.

FIG. 3 is a side view of a through glass antenna system. The through glass antenna including design elements when placed on front windshield 314 and the rear windshield 316 of a vehicle. This implementation shows two transmission locations on the outside of the vehicle. Each location utilizes antenna, an external wireless coupler, and an internal wireless coupler. The antenna may be a stub, whip, or monopole antenna. The couplers may be any of the couplers described throughout this application (e.g. patch or slot antennas). The transmission location on the front windshield 314 utilizes an antenna 310, an external coupler 320, an internal coupler 322. The internal coupler 322 communicates with the external coupler 320 through the windshield 314 to deliver the RF signal to the antenna 310. Similarly, RF signals received by the antenna 310 may be provided to the external coupler 320 and communicated by the external coupler 320 through the windshield 314 to the internal coupler 322.

The transmission location on the rear windshield 316 utilizes an antenna 312, an external coupler 330, an internal coupler 332. The internal coupler 332 communicates with the external coupler 330 through the windshield 316 to deliver the RF signal to the antenna 312. Similarly, RF signals received by the antenna 312 may be provided to the external coupler 330 and communicated by the external coupler 330 through the windshield 316 to the internal coupler 332. The antennas may be directly connected to the external couplers, as illustrated in FIG. 3. In addition, the same structure discussed above may be attached to couple through a side window on a vehicle.

Figure 4:
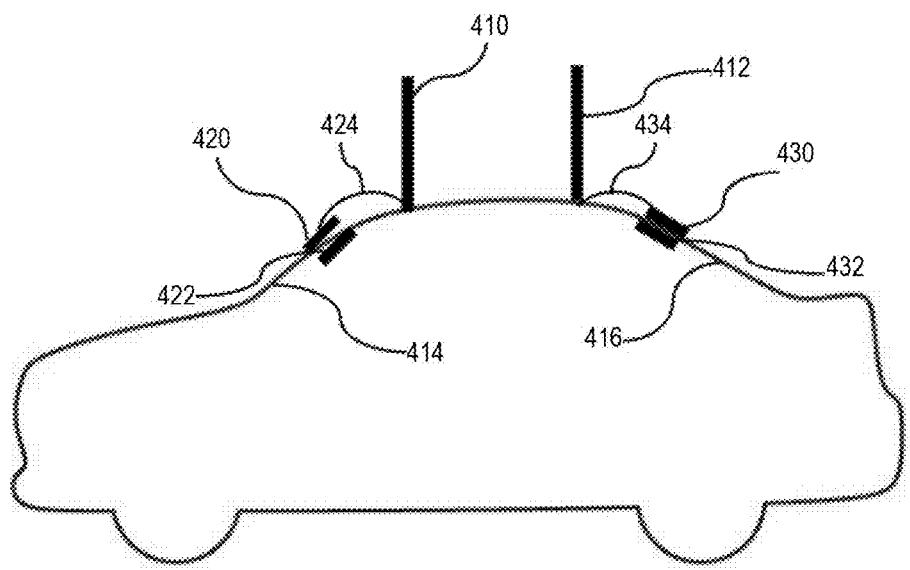
FIG. 4 is a side view of the through glass antenna system with design elements that are indirectly connected when placed on the front or rear windshield of a vehicle.

FIG. 4 is a side view of the through glass antenna system with design elements that are indirectly connected when placed on front windshield 414 and the rear windshield 416 of a vehicle. This implementation shows two transmission locations on the outside of the vehicle. Each location utilizes an antenna, an external wireless coupler, and an internal wireless coupler. The antenna may be a stub, whip, or monopole antenna. The couplers may be any of the couplers described throughout this application (e.g. patch or slot antennas). The transmission location on the front windshield 414 utilizes an antenna 410, an external coupler 420, an internal coupler 422. The internal coupler 422 communicates with the external coupler 420 through the windshield 414 to deliver the RF signal to the antenna 410. The RF signal may be communicated between the external coupler 420 and the antenna 410 through a co-axial cable 424. Similarly, RF signals received by the antenna 410 may be provided to the external coupler 420 through the co-axial cable 424 and communicated by the external coupler 420 through the windshield 414 to the internal coupler 422.

The transmission location on the rear windshield 416 utilizes an antenna 412, an external coupler 430, an internal coupler 432. The internal coupler 432 communicates with the external coupler 430 through the windshield 416 to deliver the RF signal to the antenna 412. The RF signal may be communicated between the external coupler 430 and the antenna 412 through a co-axial cable 434. Similarly, RF signals received by the antenna 412 may be provided to the external coupler 430 through the co-axial cable 434 and communicated by the external coupler 430 through the windshield 416 to the internal coupler 432. The antenna may be indirectly connected to the external coupler via co-axial cable. The co-axial cable may be impedance matched with the external coupler. In addition, the same structure discussed above may be attached to couple through a side window on a vehicle.

Figure 5:
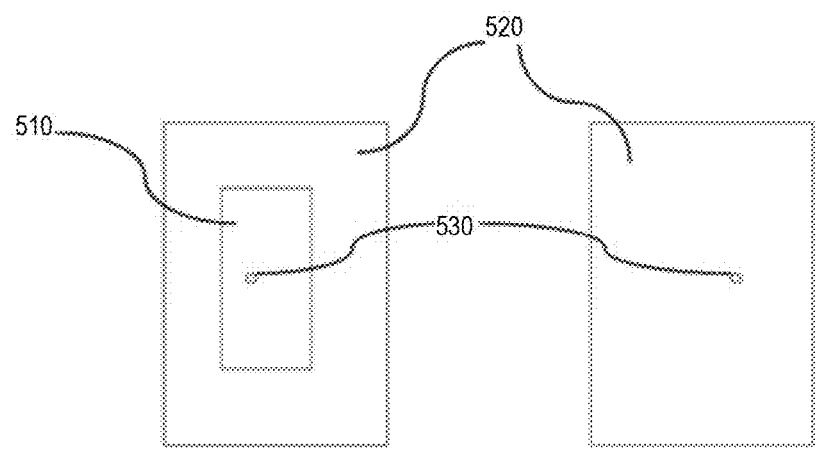
FIG. 5 illustrates a front and a back view of a micro-strip patch/slot coupled antenna that may be used as either the internal or external coupler.

FIG. 5 includes a front and back view of a micro-strip patch/slot coupled antenna that may be used as either the internal or external coupler. The antenna includes a conductive plate 510 that is used for transmission of the RF signal. The substrate 520 may be formed from materials such as FR-4, Rojer, Taconic TLC etc. The coupler may be configured to resonate at between about 5.70 and 5.95 GHz. In some implementations, the substrate may have a dielectric constant of between 0.8 and 20. The substrate may also have a loss tangent less than 2. The substrate may have a width of between 2 and 80 mm, a length of between 4 and 100 mm, and a height between 0.5 and 10 mm. The conductive plate 510 may have a width of 2 and 50 mm, a length of between 2 and 60 mm, and a height between 0.5 and 4 mm. The signal may be fed to the coupler through a feeding mechanism, such as co-axial cable, attached at the feed location 530. In each case described in this specification, a second conductive plate (e.g. ground plate) may be about the same size as the substrate.

In some implementations, the substrate may have a dielectric constant of between 0.8 and 12. The substrate may also have a loss tangent less than 0.03. The substrate may have a width of between 15 and 40 mm, a length of between 11 and 38 mm, and a height between 0.5 and 4 mm. The conductive plate 510 may have a width of between 5 and 30 mm, a length of between 2 and 28 mm, and a height between 0.5 and 4 mm. The signal may be fed to the coupler through a feeding mechanism, such as co-axial cable, attached at the feed location 530. In each case described in this specification, a second conductive plate (e.g. ground plate) may be about the same size as the substrate. The feed location may be between 0.1 and 16 mm in X (length direction) and between 1 and 16 mm in Y (width direction) from the center of the transmission plate.

In certain implementations, the substrate may be made of foam. The foam may have a dielectric constant of about 1.03 and a loss tangent of about 0. For a foam substrate, the substrate may have a width of between 30 to 40 mm, a length of between 28 to 38 mm and a height between 0.5 to 4 mm. The conductive plate may have a width of between 20 to 30 mm, a length of between 18 to 28 mm, and a height between 0.5 to 4 mm. The feed location may be between 6 to 16 mm in X and between 6 to 16 mm in Y.

In certain implementations, the substrate may be made of an epoxy resin, a woven glass fabric, or a brominated flame retardant, for example FR-4. The FR-4 may have a dielectric constant of about 4.4 and a loss tangent of about 0.02. For a FR-4 substrate, the substrate may have a width of between 20 to 30 mm, a length of between 15 to 25 mm and a height between 0.5 and 4 mm. The conductive plate may have a width of between 10 to 20 mm, a length of between 6 to 16 mm, and a height between 0.5 to 4 mm. The feed location may be between 0.1 to 10.1 mm in X and between 2 to 12 mm in Y.

In certain implementations, the substrate may be made of hydrocarbon ceramic laminates or standard glass epoxy such as provided by Rojer Corporation.

The hydro carbon ceramic may have a dielectric constant of about 2.2 and a loss tangent of about 0.0009. For a hydro carbon ceramic, the substrate may have a width of between 25 to 35 mm, a length of between 20 to 30 mm and a height between 0.5 to 4 mm. The conductive plate may have a width of between 15 to 25 mm, a length of between 12 to 22 mm, and a height between 0.5 to 4 mm. The feed location may be between 0.5 to 10.5 mm in X and between 6 to 16 mm in Y.

In certain implementations, the substrate may be made of ceramic. The ceramic may have a dielectric constant of about 11.2 and a loss tangent of about 0.005. For a ceramic substrate, the substrate may have a width of between 15 to 25 mm, a length of between 11 to 21 mm and a height between 0.5 to 4 mm. The conductive plate may have a width of between 5 to 15 mm, a length of between 2 to 12 mm, and a height between 0.5 to 4 mm. The feed location may be between 0.1 to 10.1 mm in X and between 1 to 11 mm in Y.

As such, certain example implementations are provided in Table 1 below for an optimized design that resonates between 5.70 and 5.95 GHz.

TABLE 1

| Different Substrate Materials | Dimensions (mm) Width × Length × Height of the Patch | Width × Length × Height of the Substrate | Feed Location Xf × Yf |
|---|---|---|---|
| Foam | (20 to 30) × (18 to 28) × (0.1 to 4) | (30 to 40) × (28 to 38) × (0.5 to 4) | (6 to 16) × (6 to 16) |
| Rojer | (15 to 25) × (12 to 22) × (0.1 to 4) | (25 to 35) × (20 to 30) × (0.5 to 4) | (0.5 to 10.5) × (6 to 16) |
| Fr-4 | (10 to 20) × (6 to 16) × (0.1 to 4) | (20 to 30) × (15 to 25) × (0.5 to 4) | (0.1 to 10.1) × (2 to 12) |
| Ceramic | (5 to 15) × (2 to 12) × (0.1 to 4) | (15 to 25) × (11 to 21) × (0.5 to 4) | (0.1 to 10.1) × (1 to 11) |

The coupler may be configured to resonate at between about 5.850 and 5.925 GHz. In some implementations, the substrate may have a dielectric constant of between 0.8 and 12. The substrate may also have a loss tangent less than 0.03. The substrate may have a width of between 15 and 39 mm, a length of between 12 and 37 mm, and a height between 0.5 and 4 mm. The conductive plate 510 may have a width of between 6 and 29 mm, a length of between 3 and 27 mm, and a height between 0.5 and 4 mm. The signal may be fed to the coupler through a feeding mechanism, such as co-axial cable, attached at the feed location 530. The feed location may be between 0.01 and 14 mm in X (length direction) and between 0.5 and 15 mm in Y (width direction) from the center of the transmission plate.

As such, certain example implementations are provided in Table 2 below for an optimized design that resonates between 5.850 and 5.925 GHz.

The coupler may be configured to resonate at between about 5.725 and 5.850 GHz. In some implementations, the substrate may have a dielectric constant of between 0.8 and 12. The substrate may also have a loss tangent less than 0.03. The substrate may have a width of between 16 and 38.5 mm, a length of between 11 and 36 mm, and a height between 0.5 and 4 mm. The conductive plate 510 may have a width of between 7 and 28 mm, a length of between 3 and 26.5 mm, and a height between 0.5 and 4 mm. The signal may be fed to the coupler through a feeding mechanism, such as co-axial cable, attached at the feed location 530. The feed location may be between 0.01 and 14 mm in X (length direction) and between 1 and 14 mm in Y (width direction) from the center of the transmission plate.

As such, certain example implementations are provided in Table 3 below for an optimized design that resonates between 5.725 and 5.850 GHz.

TABLE 2

| Different Substrate Materials | Dimensions (mm) Width × Length × Height of the Patch | Width × Length × Height of the Substrate | Feed Location Xf × Yf |
|---|---|---|---|
| Foam | (21 to 29) × (19 to 27) × (0.1 to 4) | (31 to 39) × (29 to 37) × (0.5 to 4) | (7 to 15) × (7 to 15) |
| Rojer | (16 to 24) × (13 to 21) × (0.1 to 4) | (25 to 33) × (21 to 29) × (0.5 to 4) | (1 to 9) × (6 to 14) |
| Fr-4 | (12 to 20) × (7 to 15) × (0.1 to 4) | (21 to 29) × (16 to 24) × (0.5 to 4) | (0.01 to 8) × (3 to 11) |
| Ceramic | (6 to 14) × (3 to 11) × (0.1 to 4) | (15 to 23) × (12 to 20) × (0.5 to 4) | (0.01 to 6) × (0.5 to 7) |

TABLE 3

| Different Substrate Materials | Dimensions (mm) | | |
|---|---|---|---|
| | Width × Length × Height of the Patch | Width × Length × Height of the Substrate | Feed Location Xf × Yf |
| Foam | (20 to 28) × (18.5 to 26.5) × (0.1 to 4) | (30.5 to 38.5) × (28 to 36) × (0.5 to 4) | (6 to 14) × (5.5 to 14) |
| Rojer | (16.5 to 23.5) × (11 to 19) × (0.1 to 4) | (26 to 34) × (22 to 30) × (0.5 to 4) | (2 to 10) × (5 to 13) |
| Fr-4 | (11 to 19) × (8 to 16) × (0.1 to 4) | (20 to 28) × (16.5 to 23.5) × (0.5 to 4) | (0.02 to 7) × (4 to 12) |
| Ceramic | (7 to 15) × (3 to 11) × (0.1 to 4) | (16 to 24) × (11 to 19) × (0.5 to 4) | (0.01 to 7) × (1 to 9) |

Figure 6:
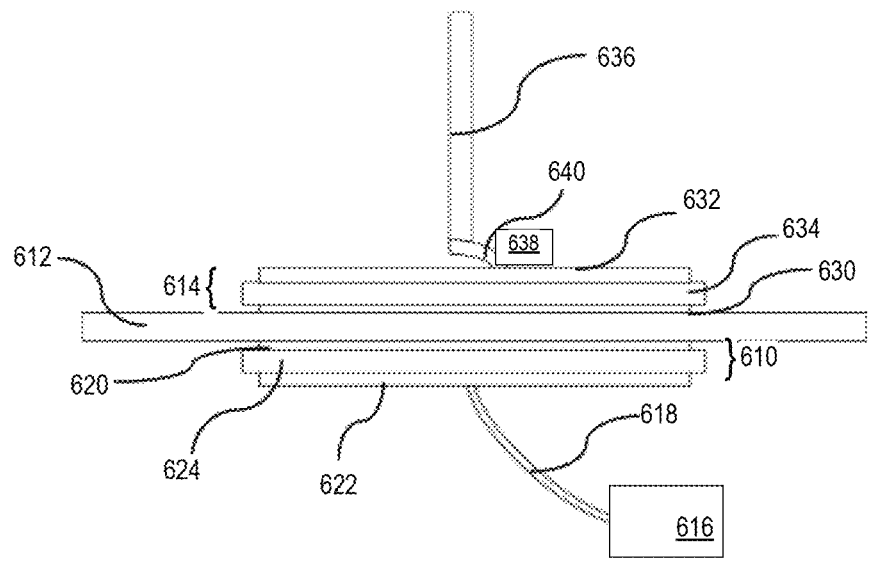
FIGS. 6a and 6b are block diagrams of vehicle communication systems using a though glass coupler.
Figure 6:
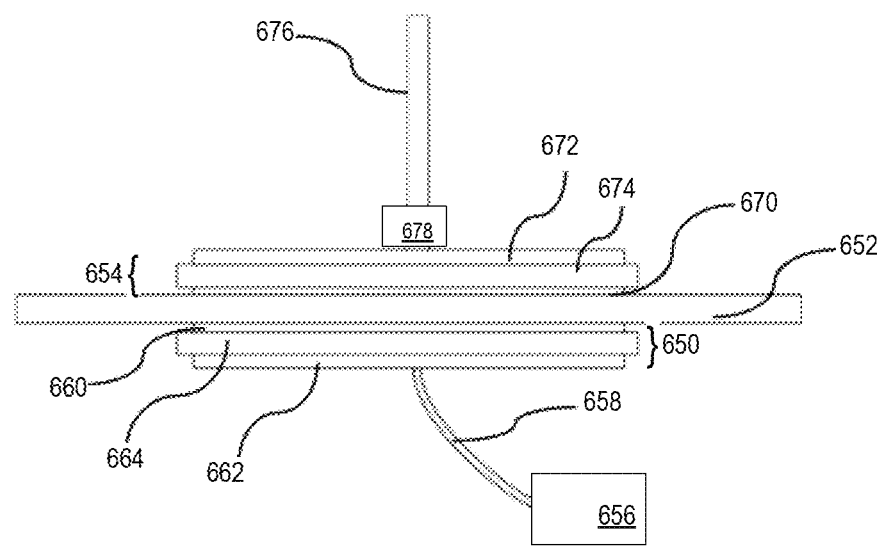

FIG. 6a is a block diagram of a vehicle communication system using a through glass coupler. The system may include a first wireless coupler 610 and a second wireless coupler 614. The first wireless coupler 610 may be attached to a first side of a window 612 and may be configured to receive the radio frequency signal from a transceiver 616. The transceiver 616 may, for example, be part of a processor for vehicle to everything communications. The transceiver 616 may provide the radio frequency signal to the first wireless coupler 610 through a cable 618. In some implementations, the transceiver 616 may be connected directly the first wireless coupler 610. The first wireless coupler 610 may include a first conductive plate 620, a second conductive plate 622, and a dielectric layer 624 in a sandwich structure. The conductive plates 620, 622 may be made of copper or other various conductive materials. The dielectric layer 624 may isolate the first conductive plate 620 from the second conductive plate 622. The dielectric layer 624 may be made from various non-conductive materials such as FR4 or Rojer Taconic TLC, etc. The characteristics of the first conductive plate 620, the second conductive plate 622, and the dielectric layer 624 of the first wireless coupler 610 may be configured to resonate at a frequency between the range of 5.70 and 5.95 GHz. The surface area of the first conductive plate 620 may be smaller than the surface area of the second conductive plate 622. The first conductive plate 620 may be closer to the window 612 than the second conductive plate 622 and the first conductive plate 620 may act as a transmission plate while the second conductive plate 622 may be a ground plate.

The system may also include a second wireless coupler 614 attached to a second side of the window 612. The second wireless coupler 614 may be aligned with the first wireless coupler 610. For example, the first conductive plate 630 of the second wireless coupler 614 may be substantially parallel with the first conductive plate 620 of the first wireless coupler 610. Further, the outline of the first conductive plate 630 of the second wireless coupler 614 projected perpendicular to the surface of the first conductive plate 630 would substantially overlap with the outline of the first conductive plate 620 of the first wireless coupler 610. The first wireless coupler 610 being configured to transmit the radio frequency signal from the first wireless coupler 610 to the second wireless coupler 614 through the window 612. The second wireless coupler 614 may include the first conductive plate 630, a second conductive plate 632, and a dielectric layer 634 in a sandwich structure. The conductive plates 630, 632 may be made copper or other various conductive materials. The dielectric layer 634 may isolate the first conductive plate 630 from the second conductive plate 632. The first conductive plate 630 may be smaller in width or length than the dielectric layer 634. Further, the surface area of first conductive plate 630 may be smaller than the surface area of the dielectric layer 634. The dielectric layer 634 may be made from various non-conductive materials such as FR4 or Rojer Taconic TLC, etc. The characteristics of the first conductive plate 630, the second conductive plate 632, and the dielectric layer 634 of the second wireless coupler 614 may be configured to resonate at a frequency between the range of 5.70 and 5.95 GHz, and more specifically in some applications 5.850 and 5.925 GHz, and yet in some applications 5.725 and 5.850 GHz. Further, the characteristics of the second wireless coupler 614 may be the same as the first wireless coupler 610. The first conductive plate 630 may be smaller in width or length than the second conductive plate 632. Further, the surface area of first conductive plate 630 may be smaller than the surface area of the second conductive plate 632. The first conductive plate 630 may be closer to the window 612 than the second conductive plate 632 and the first conductive plate 630 may act as a transmission plate while the second conductive plate 632 may be a ground plate.

An antenna 636, such as a whip antenna or stub antenna or monopole antenna, may be electrically connected to the second wireless coupler 614 and configured to transmit and/or receive the radio frequency signal outside the vehicle. The antenna 636 may be configured to extend from the second wireless coupler 614 to above the roof line of the vehicle. The antenna 636 may be configured to transmit at a frequency between the range of 5.70 and 5.95 GHz, and more specifically in some applications 5.850 and 5.925 GHz, and yet in some applications 5.725 and 5.850 GHz.

The system may include an amplifier 638 in conjunction the second wireless coupler 614 configured to amplify the radio frequency signal. The amplifier 638 may be positioned electrically between the second wireless coupler 614 and the antenna 636. The second wireless coupler 614 may inductively receive power from the first wireless coupler 610 to power the amplifier circuit 638. The antenna 636 or the amplifier circuit 638 may be directly connected to the second wireless coupler 614 or connect via a cable 640.

In some implementations, the system may include an inductive coupling to provide power to the amplifier 638. The second wireless coupler may include a coil to wirelessly receive power from a coil in the first wireless coupler. Further, the second coupler may include one or more switches to disable or bypass the amplifier circuit. The switches may be activated based on the supply of power from the first wireless coupler or a control signal which may be provide via various means including electrical, magnet, or optical signals. The amplifier may be switched on or off based on various factors, for example, expected distance of transmission, weather conditions, vehicle speed, which may be measured using various sensors for distance, weather, or speed. Expected distance of transmission may, in one example, be determined by received signal strength for example.

FIG. 6b is a block diagram of a vehicle communication system using a through glass coupler. The system may include a first wireless coupler 650 and a second wireless coupler 654. The first wireless coupler 650 may be attached to a first side of a window 652 and may be configured to receive the radio frequency signal from a transceiver 656. The transceiver 656 may, for example, be part of a processor for vehicle to everything communications. The transceiver 656 may provide the radio frequency signal to the first wireless coupler 650 through a cable 658. In some implementations, the transceiver 656 may be connected directly the first wireless coupler 650. The first wireless coupler 650 may include a first conductive plate 660, a second conductive plate 662, and a dielectric layer 664 in a sandwich structure. The conductive plates 660, 662 may be made of copper or other various conductive materials. The dielectric layer 664 may isolate the first conductive plate 660 from the second conductive plate 662. The dielectric layer 664 may be made from various non-conductive materials such as FR4 or Rojer Taconic TLC, etc. The characteristics of the first conductive plate 660, the second conductive plate 662, and the dielectric layer 664 of the first wireless coupler 650 may be configured to resonate at a frequency between the range of 5.70 and 5.95 GHz. The surface area of the first conductive plate 660 may be smaller than the surface area of the second conductive plate 662. The first conductive plate 660 may be closer to the window 652 than the second conductive plate 662 and the first conductive plate 660 may act as a transmission plate while the second conductive plate 662 may be a ground plate.

The system may also include a second wireless coupler 654 attached to a second side of the window 652. The second wireless coupler 654 may be aligned with the first wireless coupler 650. For example, the first conductive plate 670 of the second wireless coupler 654 may be substantially parallel with the first conductive plate 660 of the first wireless coupler 650. Further, the outline of the first conductive plate 670 of the second wireless coupler 654 projected perpendicular to the surface of the first conductive plate 670 would substantially overlap with the outline of the first conductive plate 660 of the first wireless coupler 650. The first wireless coupler 650 being configured to transmit the radio frequency signal from the first wireless coupler 650 to the second wireless coupler 654 through the window 652. The second wireless coupler 654 may include the first conductive plate 670, a second conductive plate 672, and a dielectric layer 674 in a sandwich structure. The conductive plates 670, 672 may be made copper or other various conductive materials. The dielectric layer 674 may isolate the first conductive plate 670 from the second conductive plate 672. The first conductive plate 670 may be smaller in width or length than the dielectric layer 674. Further, the surface area of first conductive plate 670 may be smaller than the surface area of the dielectric layer 674. The dielectric layer 674 may be made from various non-conductive materials such as FR4 or Rojer Taconic TLC, etc. The characteristics of the first conductive plate 670, the second conductive plate 672, and the dielectric layer 674 of the second wireless coupler 654 may be configured to resonate at a frequency between the range of 5.70 and 5.95 GHz, and more specifically in some applications 5.850 and 5.925 GHz, and yet in some applications 5.725 and 5.850 GHz. Further, the characteristics of the second wireless coupler 654 may be the same as the first wireless coupler 650. The first conductive plate 670 may be smaller in width or length than the second conductive plate 672. Further, the surface area of first conductive plate 670 may be smaller than the surface area of the second conductive plate 672. The first conductive plate 670 may be closer to the window 652 than the second conductive plate 672 and the first conductive plate 670 may act as a transmission plate while the second conductive plate 672 may be a ground plate.

An antenna 676, such as a whip antenna or stub antenna or monopole antenna, may be electrically connected to the second wireless coupler 654 and configured to transmit and/or receive the radio frequency signal outside the vehicle. The antenna 676 may be configured to extend from the second wireless coupler 654 to above the roof line of the vehicle. The antenna 676 may be configured to transmit at a frequency between the range of 5.70 and 5.95 GHz, and more specifically in some applications 5.850 and 5.925 GHz, and yet in some applications 5.725 and 5.850 GHz.

The system may include an amplifier 678 in conjunction the second wireless coupler 654 configured to amplify the radio frequency signal. The amplifier 678 may be positioned electrically between the second wireless coupler 654 and the antenna 676. The second wireless coupler 654 may inductively receive power from the first wireless coupler 650 to power the amplifier circuit 678. The antenna 676 or the amplifier circuit 638 may be directly connected to the second wireless coupler 654.

In some implementations, the system may include an inductive coupling to provide power to the amplifier 678. The second wireless coupler may include a coil to wirelessly receive power from a coil in the first wireless coupler. Further, the second coupler may include one or more switches to disable or bypass the amplifier circuit. The switches may be activated based on the supply of power from the first wireless coupler or a control signal which may be provide via various means including electrical, magnet, or optical signals. The amplifier may be switched on or off based on various factors, for example, expected distance of transmission, weather conditions, vehicle speed, which may be measured using various sensors for distance, weather, or speed. Expected distance of transmission may, in one example, be determined by received signal strength for example.

Figure 7:
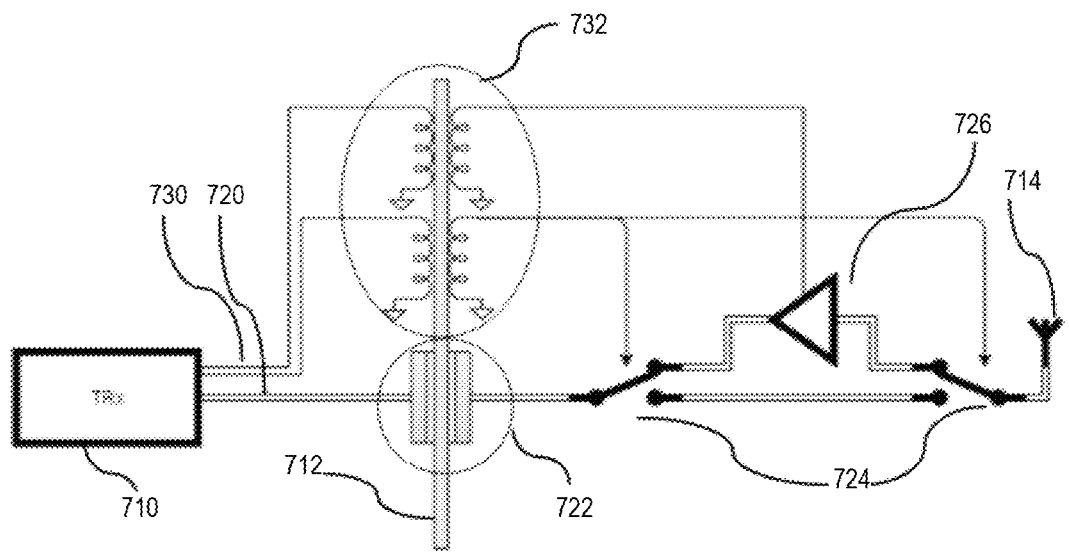
FIG. 7 is a schematic view of a vehicle communication system including an amplifier and a power coupling.

FIG. 7 is a schematic view of a vehicle communication system including an amplifier and a power coupling. A transmitter 710 may provide a signal along a communication path 720 (e.g. a co-axial cable) to a coupler 722. The coupler 722 may be a wireless coupler as discussed elsewhere in this application. For example, the coupler 722 may include a first wireless coupler and a second wireless coupler aligned on opposite sides of the window 712 as described with regard to FIG. 6 and other Figures throughout the application. The signal from the coupler 722 may be provided to an amplifier 726, through a switching arrangement 724. The switching arrangement 724 may be configured to direct the signal through the amplifier 726 or bypass the amplifier 726 in response to various conditions. The signal is then provided to an antenna 714 for transmission from the vehicle.

The switches of the amplifier 726 may be activated based on the supply of power 730 from an inductive coupling 732 across the windshield 712. The coupler 722, the inductive coupling 732, the switching arrangement 724, and/or the amplifier 726 may be contained within the same device attached to the window 712. The amplifier may be switched on or off based on various factors, for example, expected distance of transmission, weather conditions, vehicle speed, which may be measured using various sensors for distance, weather, or speed. Expected distance of transmission may, in one example, be determined by received signal strength for example.

Figure 8:
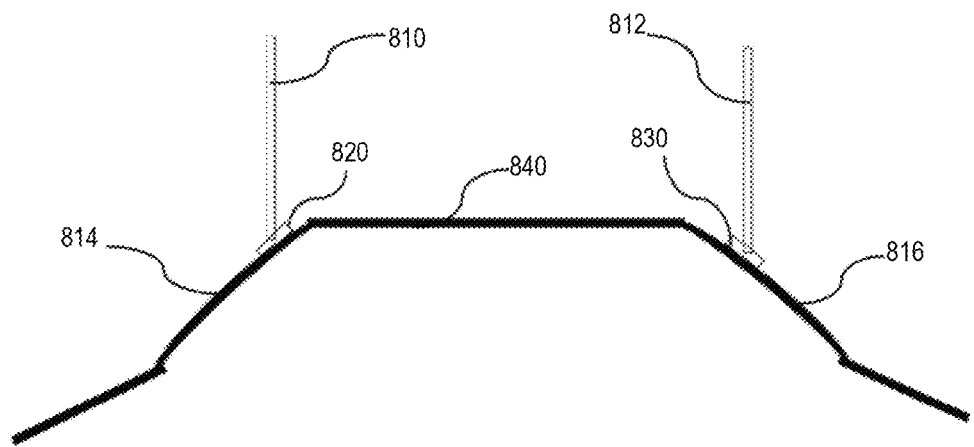
FIG. 8 is a side view illustrating placement of a through glass antenna system.

FIG. 8 is a side view illustrating placement of a through glass antenna system. The antennas are placed on a front windshield 814 and a rear windshield 816 of the vehicle. This implementation shows two transmission locations on the outside of the vehicle. Each location utilizes a stub or whip antenna and a coupler. The coupler may include an external wireless coupler and an internal wireless coupler as discussed elsewhere in this application. The transmission location on the front windshield 814 utilizes an antenna 810 and a coupler 820. The coupler 820 communicates an RF signal through the windshield 814 to the antenna 810. Similarly, RF signals received by the antenna 810 may be provided to the coupler 820 and communicated by the coupler 820 through the windshield 814 to a control unit inside the vehicle.

The transmission location on the rear windshield 816 utilizes an antenna 812 and a coupler 830. The coupler 830 communicates the RF signal through the windshield 816 to the antenna 812. Similarly, RF signals received by the antenna 812 may be communicated by the coupler 830 through the windshield 816 to control unit inside the vehicle.

The antennas may be attached to the window or roof of the vehicle and may extend away from the vehicle. The antennas may extend upward and above the roof line to reduce interference of the vehicle structure with the transmitted signal. In some examples, the antenna may extend between 10 and 200 cm above the roof line of the vehicle. The stub/monopole antenna height may be chosen in response to antenna performance parameters, some of the antenna performance parameters considered are Bandwidth, Polarization, antenna efficiency, antenna gain, loss etc. Aesthetics & Flexibility may also considered during the stub/monopole antenna design/fabrication. The polarization of the antenna at 5.70-5.95 GHz and more specifically in some applications 5.850-5.925 GHz, and yet in some applications 5.725-5.850 GHz, may be very important for some applications and a perfectly polarized antenna helps in maintaining a good communication link. The stub/whip antenna which are used in the through glass antenna design may be designed to be polarized omni-directional via azimuth and vertical/omni-directional via elevation.

Figure 9:
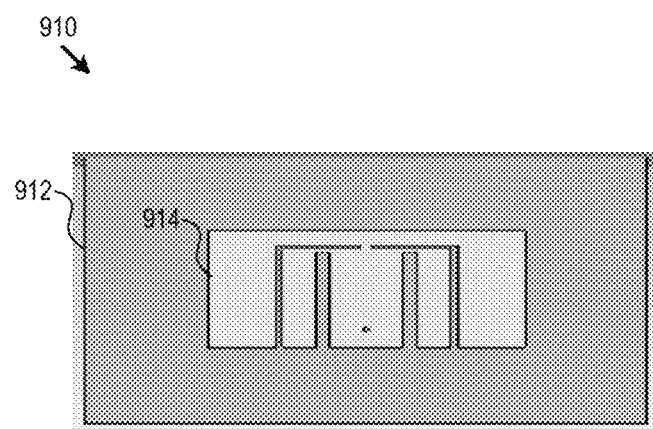
FIG. 9 illustrates possible implementations of patch or slot antennas that may be used for the internal or external couplers.

FIG. 9 illustrates possible implementations of patch or slot antennas that may be used for the internal or external couplers. One example of a patch antenna that may be used for the couplers is provided at reference numeral 910. The patch antenna includes a substrate 912 and a transmission plate 914. The transmission plate 914 may be flush with surface of the substrate 912. In some implementations, the transmission plate 914 may be a layer applied onto the surface of the substrate 912. The size, shape, and thickness of the transmission plate 914 will determine the frequency at which the transmission plate will resonate. The transmission plate 914 has multiple slots having different shapes and sized formed in the transmission plate. The size and shape of the slots can be used to tune the frequency characteristics of the transmission plate 914.

The antenna design may have internal and external wireless couplers where the external wireless coupler has an antenna/RF chain system including an unloaded self-resonant antenna on a first side of the dielectric (e.g. window), an internal wireless coupler which has a transceiver on the opposite side of the dielectric (e.g. window), a radio frequency (RF) coupler for passing RF energy through the dielectric (e.g. window), and power/control transmission circuitry to provide electrical power and control signals for the antenna electronics.

If necessary, for boosting the RF power internal/external wireless coupler may have a low-noise amplifier with a bypass relay. The DC power and control signals which are used to transfer the energy across the dielectric (e.g. window) are via magnetic induction.

The RF coupling unit may be implemented using coupled microstrip patch/slot antennas. A co-axial cable may be used to connect the radio transmitter to the RF coupling unit. Impedance matching of the radio transmitter connection (e.g. co-axial cable) to the interior patch antenna may be done to maintain the transmission line impedance and also minimize the parasitic coupling on the windshield because of the moisture. Similarly, impedance matching of the stub antenna connection (e.g. co-axial cable) to the exterior patch antenna may be done to maintain the transmission line impedance and also minimize the parasitic coupling on the windshield because of the moisture.

The coupler assembly may include a connector to which transmission medium is connected to carry electromagnetic signals to and from the system and antenna. The transmission medium may be a low loss coaxial cable. Due to the position of the ECU in the vehicle, a low loss coaxial cable will decrease the cable losses and improve the antenna performance.

The placement of the antenna may be very important for vehicle to everything (V2X) safety applications; so it is proposed to place this antenna on the top of the front/rear/side windshield's without obstructing the view of the driver, considering the vehicle aero-dynamics and best performance of the antenna. Furthermore, the antenna may protrude above the roofline to avoid RF signal deterioration.

The through glass antenna yields better results than inside vehicle antennas related to gain, polarization, bandwidth etc. The higher the gain, the better the range of communication. The use of the through glass antenna can improve the radiation pattern when compared to an inside vehicle antenna. An inside vehicle antennas may face interference and multi-path propagation issues due to vehicle pillars which in turn effects the antenna performance. Also, with this kind of antenna design and placement, the chances of improving the receiving sensitivity are higher because of the antenna elevation. Elevation matters when communicating with the different vehicles, infrastructure, pedestrians, cloud & everything and will give better signal strength in an urban environment when compared to an inside vehicle antenna.

The stub antenna height (which is connected at/from the external wireless coupler) is based on the desired DSRC frequency maintaining minimum dimensions of DSRC wavelengths for efficient V2X communication. The stub antenna provides a minimum of >3 dBi gain performance for better DSRC communication. The stub antenna can be connected directly to external wireless coupler (or) it can also be connected indirectly via co-axial cable to the external wireless coupler.

In the through glass antenna, the selection of antenna substrate material may be very important either for stub/monopole or patch/slot antennas etc. The substrate materials have two basic properties; such as dielectric constant and loss tangent. The lower the dielectric constant and loss tangent of the substrate the better the antenna performance. They are the factors that determine patch antenna and ground plane lengths and widths, the substrate thickness and patch antenna feed point location.

The stub/monopole antenna height may be chosen in response to various antenna performance parameters. Some of the antenna performance parameters considered are Bandwidth, Polarization, antenna efficiency, antenna gain, loss etc. Feeding (e.g. transmitting) electromagnetic energy to an antenna at a particular position and feeding type plays a vital role in the antenna design. The role of feeding (e.g. transmission) medium may be very important in case of efficient operation of antenna to improve the antenna input impedance matching. Based on the antenna efficiency, one of the feeding technique such as inset feed (or) microstrip line feed (or) co-axial feed (or) aperture coupled feed (or) proximity coupled feed may be utilized.

In the through glass antenna design, the selection of antenna substrate material may be important either for stub/monopole or patch/slot antennas etc. In the selection of antenna substrate materials, permittivity (dielectric constant) of substrate is critical parameter and which in turn effects the antenna performance such as resonance frequency, bandwidth, gain, return loss, input impedance, radiation pattern.

The substrate materials have two basic properties; such as dielectric constant and loss tangent. Depending upon the antenna performance at 5.70-5.95 GHz, and more specifically in some applications 5.850 and 5.925 GHz, and yet in some applications 5.725 and 5.850 GHz, the substrate materials such as FR4 (or) Rojer (or) foam (or) ceramic etc. has been considered in this patent. The design may be important because of the DSRC operating frequency band i.e. 5.850-5.925 GHz and the omni-directional polarization.

The output antenna (e.g. stub, whip, or monopole antenna) can play an important role in the through glass antenna. The design may be very crucial because of the DSRC operating frequency band and the omni-directional polarization transmission. Considering the antenna performance parameters, the output antenna height may be selected allowing a wide transmission angle without interference. Some of the antenna performance parameters that may be considered include Bandwidth, Polarization, antenna efficiency, antenna gain, loss etc. However, aesthetics and flexibility are also considered during the output antenna design/fabrication. Very good isolation between the output can been achieved using different variations of the output antenna provided herein. Isolation can be very important especially when multiple channels are being transmitted contemporaneously.

Characteristics of a stub or mono-pole antenna provided in Table 4 may be used for transmitting signals from one or more radios with one or more channels from the vehicle to an external system. Further, FIGS. 10-16 include implementations for transmitting or receiving multiple channels (e.g. multiple DSRC channels) from the one or more transceivers (e.g. DSRC radio) contemporaneously.

of the antenna may be between 0.1 mm to 90 mm and the antenna height may be between 1 mm to 600 mm. More specifically, for a foam substrate the width or radius of the antenna may be between 1.5 mm and 50 mm, for a Rojer substrate the width or radius of the antenna may be between 0.75 mm and 60 mm, for a FR-4 substrate the width or radius of the antenna may be between 0.1 mm and 70 mm, for a Ceramic substrate the width or radius of the antenna may be between 0.15 mm and 90 mm. Parameters for sub-frequency ranges 5.850-5.925 GHz and 5.725-5.850 Ghz are also provided in Table 4.

Figure 10:
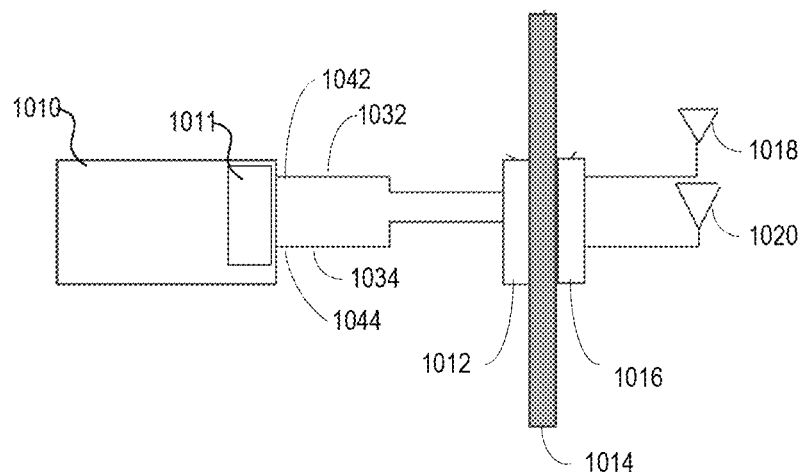
FIG. 10 is a schematic view of one implementation of a through glass integrated antenna—throughout.

FIG. 10 is a schematic view of one implementation of a through glass integrated antenna. The system includes a control unit 1010 includes one or more radios 1011 such as a multi-channel DSRC radio. The one or more radios 1011 may transmit or receive a first signal 1032 from a first connection 1042 and a second signal 1034 from a second connection 1044. The first and second signals can go to either one or both of the connections 1042, 1044 and as such may be transmitted over one or more of the antennas. The first signal 1032 may have or may not have different characteristics than the second signal 1034, for example the first signal 1032 may be transmitted at a different frequency than the second signal 1034. Both the first and second signals may be provided to an internal wireless coupler 1012. The first signal 1032 and/or second signal 1034 may be transmitted to the internal wireless coupler 1012 through a coaxial cable or traces on a circuit board if the distance is kept small. The internal wireless coupler 1012 receives the first and second signals and wirelessly communicates the first and second signal to the external wireless coupler 1016 through the window 1014. The window may be a front, a side, or a rear windshield of a vehicle. Further the window 1014 may be glass or other material. The internal and external wireless couplers 1012, 1016 may take the form of other wireless couplers described above in this application. The first and second signals having different signal characteristics may be communicated over the same wireless coupling, for example between a patch on the first wireless coupler 1012 and a corresponding patch on the second wireless coupler 1016. The first signal 1032 may be transmitted out from the external wireless coupler 1016 through a first antenna 1018. The second signal 1034 may be transmitted out from the external wireless coupler 1016 through a second antenna 1020. The antennas 1018 and 1020 may take the form of any of the antennas described above, for example a stub, whip or monopole antenna. In one example, one or more low noise amplifiers or bypass switches may be provided to pass the first signal 1032 to the

TABLE 4

| | | Different Substrates Dimensions (mm) | | | |
|---|---|---|---|---|---|
| DSRC Frequencies (GHz) | Wavelength (mm) | Foam Width/Radius × Height of the Stub/Monopole | Rojer Width/Radius × Height of the Stub/Monopole | FR-4 Width/Radius × Height of the Stub/Monopole | Ceramic Width/Radius × Height of the Stub/Monopole |
| 5.850-5.925 | 50.9338 | (1 to 50) × (1 to 500) | (0.5 to 60) × (1 to 500) | (0.5 to 70) × (1 to 500) | (0.05 to 90) × (1 to 500) |
| 5.725-5.850 | 51.8403 | (2 to 50) × (1 to 550) | (0.25 to 60) × (1 to 550) | (0.30 to 70) × (1 to 550) | (0.20 to 90) × (1 to 550) |
| 5.70 to 5.950 | 51.1945 | (1.5 to 50) × (1 to 600) | (0.75 to 60) × (1 to 600) | (0.1 to 70) × (1 to 600) | (0.15 to 90) × (1 to 600) |

Accordingly, the output antenna may transmit at frequencies between 5.7 and 5.950 Ghz. Further, the width or radius first antenna 1018 and the second signal 1034 to the second antenna 1020. The first antenna 1018 and the second antenna 1020 may be placed far enough away from each other on the vehicle to provide good isolation such that antenna performance is maintained and such that interference between the signals will be decreased. It is also understood that the system can be configured such that connection 1042 may communicate with antenna 1020 and connection 1044 may communicate with antenna 1018.

Figure 11:
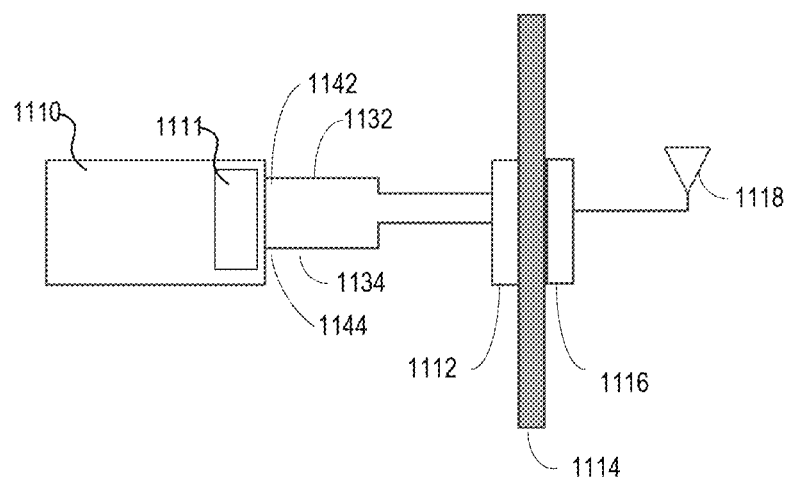
FIG. 11 is a schematic view of another implementation of a through glass integrated antenna.

FIG. 11 is a schematic view of another implementation of a through glass integrated antenna. The system includes a control unit 1110 with one or more radios 1111 such as a multi-channel DSRC radio. The one or more radios 1111 may transmit or receive a first signal 1132 and a second signal 1134. The first signal 1132 may be provided on a first connection 1142 and the second signal 1134 may be provided on a second connection 1144. The first signal 1132 may have or may not have different characteristics than the second signal 1134, for example the first signal 1132 may be transmitted at a different frequency than the second signal 1134. Both the first and second signals may be provided to an internal wireless coupler 1112. The internal wireless coupler 1112 may include a power divider and/or combiner. The first signal 1132 and/or second signal 1134 may be transmitted to the internal wireless coupler 1112 through a coaxial cable or traces on a circuit board if the distance is kept small. The internal wireless coupler 1112 receives the first and second signals and wirelessly communicates the first and second signal to the external wireless coupler 1116 through the window 1114. The internal and external wireless couplers 1112, 1116 may take the form of other wireless couplers described above in this application. The first and second signals having different signal characteristics may be communicated over the same wireless coupling, for example between a patch on the first wireless coupler 1112 and a corresponding patch on the second wireless coupler 1116. Both the first and second signals may be transmitted out from the second wireless coupler 1116 through a single antenna 1118. The antenna 1118 may take the form of any of the antennas described above, for example a stub, whip or monopole antenna.

Figure 12:
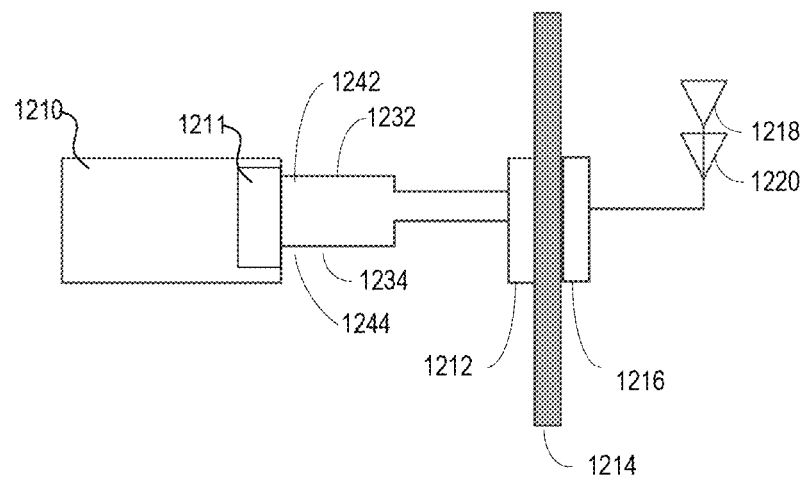
FIG. 12 is a schematic view of another implementation of a through glass integrated antenna.

FIG. 12 is a schematic view of another implementation of a through glass integrated antenna. The system includes a control unit 1210 with one or more radios 1211 such as a multi-channel DSRC radio. The one or more radios 1211 may transmit or receive a first signal 1232 and a second signal 1234. The first signal 1232 may be provided on a first connection 1242 and the second signal 1234 may be provided on a second connection 1244. The first signal 1232 may have or may not have different characteristics than the second signal 1234, for example the first signal 1232 may be transmitted at a different frequency than the second signal 1234. Both the first and second signals may be provided to an internal wireless coupler 1212. The first signal 1232 and/or second signal 1234 may be transmitted to the internal wireless coupler 1212 through a coaxial cable or traces on a circuit board if the distance is kept small. The internal wireless coupler 1212 receives the first and second signals and wirelessly communicates the first and second signal to the external wireless coupler 1216 through the window 1214. The window may be a front, a side, or a rear windshield of a vehicle. Further the window 1214 may be glass or other material. The internal and external wireless couplers 1212, 1216 may take the form of other wireless couplers described above in this application. The first and second signals having different signal characteristics may be communicated over the same wireless coupling, for example between a patch on the first wireless coupler 1212 and a corresponding patch on the second wireless coupler 1216.

The first signal 1232 may be transmitted out from the external wireless coupler 1216 through a first antenna 1218. The second signal 1234 may be transmitted out from the external wireless coupler 1216 through a second antenna 1220. The first antenna 1218 and the second antenna 1220 may be stacked. For example, a first end of the first antenna may be located proximate the vehicle. The first antenna may extend from the first end away from the vehicle to a second end. A first end of the second antenna may located proximate the second end of the first antenna. Further, the second antenna may extend away from the vehicle from the first end of the second antenna to a second end of the second antenna. The second antenna may extend along or substantially along the same axis as the first antenna. The antennas 1218 and 1220 may for example be monopole antennas. In one example, one or more low noise amplifiers or bypass switches may be provided to pass the first signal 1232 to the first antenna 1218 and the second signal 1234 to the second antenna 1220. Placing the first antenna 1218 end to end with the second antenna 1220 may significantly interference between the signals. It is also understood that the system can be configured such that connection 1242 may communicate with antenna 1220 and connection 1244 may communicate with antenna 1218.

Figure 13:
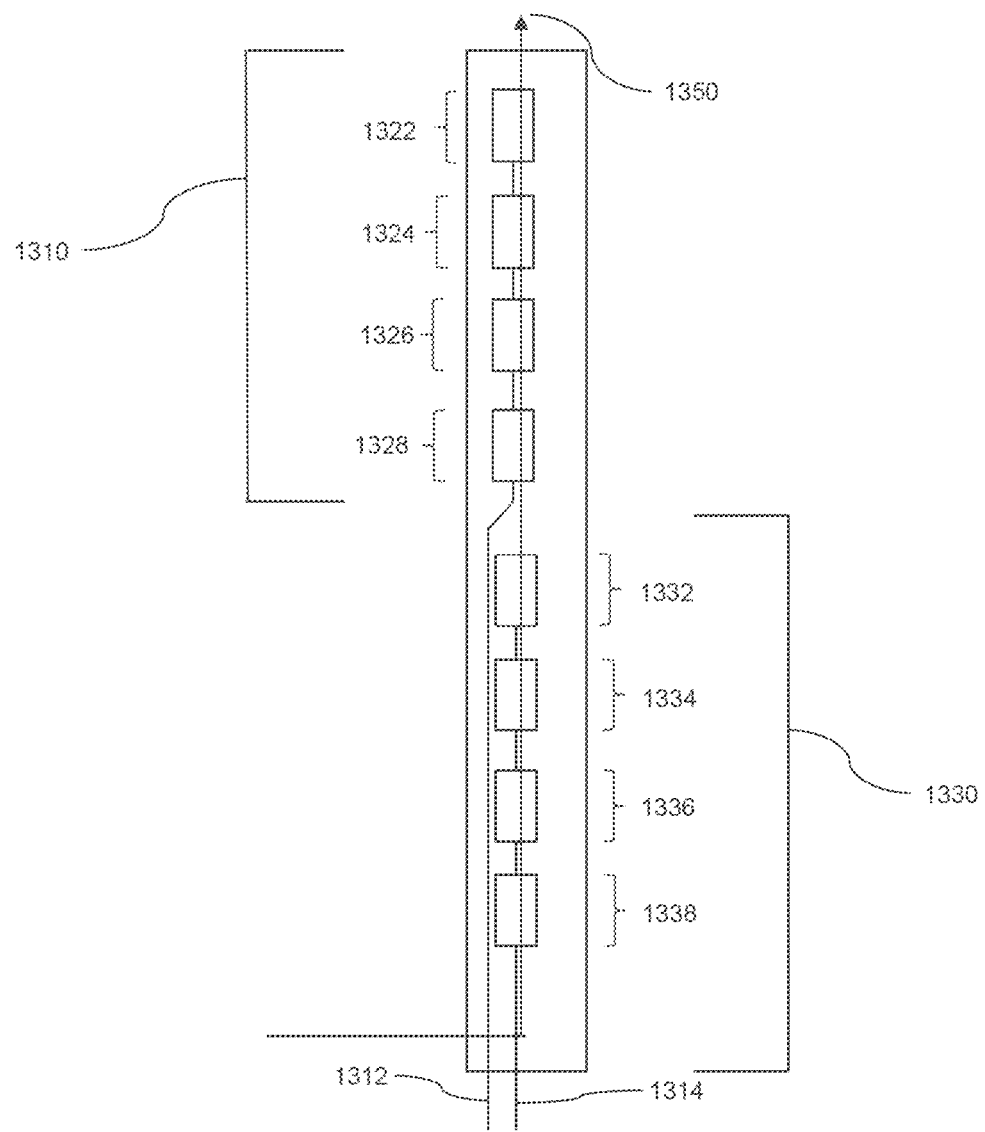
FIG. 13 is a schematic view of one example of a stacked antenna for use in the system of FIG. 12.

FIG. 13 is a schematic view of one example of a stacked antenna for use in the system of FIG. 12. The stacked antenna includes a first antenna 1310 and a second antenna 1330. While two antennas are illustrated, multiple additional may be stacked end to end to handle additional signals in the same manner. The stacked antenna may include a first connection 1312 to receive a first signal for the first antenna 1310. The stacked antenna may also include a second connection 1314 to receive a second signal for the second antenna 1330. A first end of the second antenna 1330 may extend from the connections to a second end of the second antenna 1330. A trace or coax connection may run from the first connection 1312 along the side of the second antenna 1330 to a first end of the first antenna 1310. A first end of the first antenna 1310 may located proximate the second end of the second antenna 1330. Further, the first antenna 1310 may extend away from the connections and second antenna 1310 from the first end of the first antenna 1310 to a second end of the first antenna 1310. The first antenna 1310 may extend along or substantially along the same axis 1350 as the second antenna 1330. The axis 1350 may run along the length of the antenna and may be perpendicular to a direction of signal propagation of the antennas. As such, the radiating axis of the first antenna may be substantially parallel to the radiating axis of the second antenna. Offsetting the antennas slightly may not greatly affect the performance if the length of the antennas do not substantially overlap. Also, polarization of the first antenna may be parallel to the polarization of the second antenna.

The first antenna may have different transmission characteristics than the second antenna. For example, each may be optimized for different frequency signals, may or may not have different radiation patterns, or other characteristics. Further, each antenna may include multiple radiating portions that are spaced along the radiating axis of each antenna and may be interspersed with non-radiating portions. For example, the first antenna 1310 may include radiating portions 1322, 1324, 1326, and 1326. Although four radiating portions are shown, one or more than four radiating portions may be integrated into the first antenna 1310. The second antenna 1330 may include radiating portions 1332, 1334, 1336, and 1336. Although four radiating portions are shown, one or more than four radiating portions may be integrated into the first antenna 1330. Further, the first and second antenna may be formed on the same substrate, for example, as conductive traces laid on a substrate material such as ceramic, FR-4, Rojer, or foam. The radiating portions of the first and second antennas 1310, 1330 for example, may be designed from wire antennas, traveling wave antennas, reflector antennas, micro-strip antennas, log-periodic antennas, aperture antennas, other antennas etc.

Figure 14:
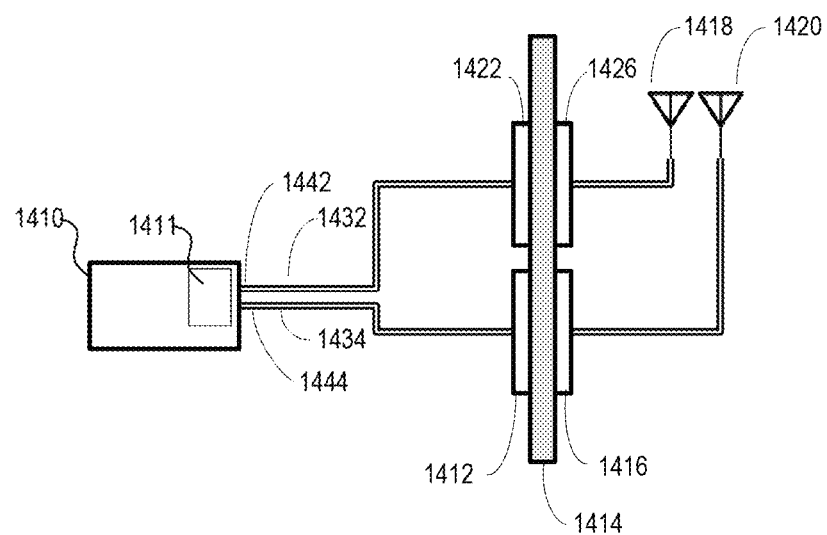
FIG. 14 is a schematic view of another implementation of a through glass integrated antenna.

FIG. 14 is a schematic view of another implementation of a through glass integrated antenna. The system includes a control unit 1410 with one or more radios 1411 such as a multi-channel DSRC radio. The one or more radios 1411 may transmit or receive a first signal 1432 and a second signal 1434. The first signal 1432 may be provided on a first connection 1442 and the second signal 1434 may be provided on a second connection 1444. The first signal 1432 may have or may not have different characteristics than the second signal 1434, for example the first signal 1432 may be transmitted at a different frequency than the second signal 1434. The first signal 1432 may be provided to a first internal wireless coupler 1422. The second signal 1434 may be transmitted to a second internal wireless coupler 1412. The first internal wireless coupler 1422 receives the first signal 1432 and wirelessly communicates the first signal 1432 to the first external wireless coupler 1426 through the window 1414. The second internal wireless coupler 1412 receives the second signal 1434 and wirelessly communicates the second signal 1434 to the second external wireless coupler 1416 through the window 1414. The window may be a front, a side, or a rear windshield of a vehicle. Further the window 1414 may be glass or other material. The internal and external wireless couplers 1422, 1426, 1412, and 1416 may take the form of other wireless couplers described above in this application. The first and second signals may have different signal characteristics. In one example, the first signal may be transmitted between a patch on the first internal wireless coupler 1412 and a corresponding patch on the second external wireless coupler 1416. The first signal 1432 may be transmitted out from the first external wireless coupler 1426 through a first antenna 1418. The second signal 1434 may be transmitted out from the second external wireless coupler 1416 through a second antenna 1420. The antennas 1418 and 1420 may take the form of any of the antennas described above, for example a stub, whip or monopole antenna. The first antenna 1418 and the second antenna 1420 may be placed far enough away from each other on the vehicle to provide good isolation such that antenna performance is maintained and such that interference between the signals will be decreased. It is also understood that the system can be configured such that connection 1442 may communicate with antenna 1420 and connection 1444 may communicate with antenna 1418.

Figure 15:
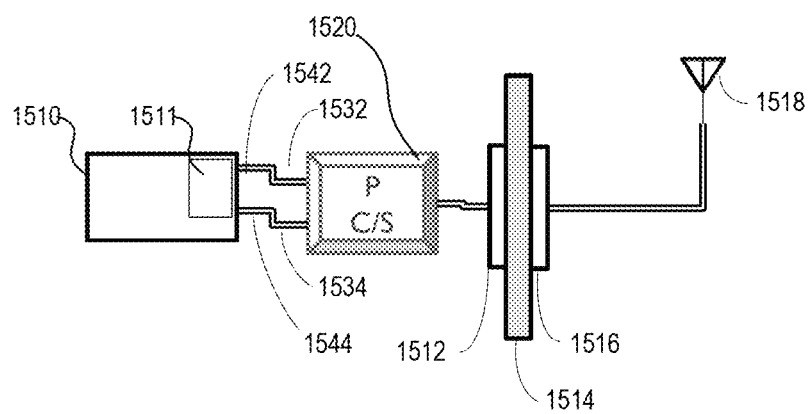
FIG. 15 is a schematic view of yet another implementation of a through glass integrated antenna.

FIG. 15 is a schematic view of yet another implementation of a through glass integrated antenna. The system includes a control unit 1510 with one or more radios 1511 such as a multi-channel DSRC radio. The one or more radios 1511 may transmit or receive a first signal 1532 and a second signal 1534. The first signal 1532 may be provided on a first connection 1542 and the second signal 1534 may be provided on a second connection 1544. The first signal 1532 may have or may not have different characteristics than the second signal 1534, for example the first signal 1532 may be transmitted at a different frequency than the second signal 1534. Both the first and second signals may be provided to a power divider or power splitter 1520. A power divider may used to divide the output into equal signals for comparison measurements. A power divider also may typically be used in test systems to measure two different characteristics of a signal, such as frequency and power, for broadband independent signal sampling. Power splitters may be constructed of two resistors. Power splitters may typically be used for leveling and ratio measurement applications to improve the effective output match of microwave sources. The power divider or power splitter may combine the signals 1532, 1534 that are transmitted and divide the signals that are being received by the control unit 1510. The first signal 1532 and/or second signal 1534 may be transmitted from the power divider or power splitter 1520 to the internal wireless coupler 1512 through a coaxial cable or traces on a circuit board if the distance is kept small. The internal wireless coupler 1512 receives the first and second signals and wirelessly communicates the first and second signal to the external wireless coupler 1516 through the window 1514. The internal and external wireless couplers 1512, 1516 may take the form of other wireless couplers described above in this application. The first and second signals having different signal characteristics may be communicated over the same wireless coupling, for example between a patch on the first wireless coupler 1512 and a corresponding patch on the second wireless coupler 1516. Both the first and second signals may be transmitted out from the second wireless coupler 1516 through a single antenna 1518. The antenna 1518 may take the form of any of the antennas described above, for example a stub, whip or monopole antenna.

Figure 16:
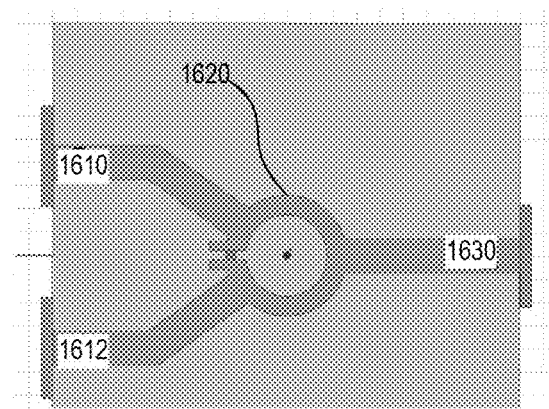
FIG. 16 is a schematic view of one example of a power divider or splitter that may be used with the system in FIG. 15.

FIG. 16 is a schematic view of one example of a power divider that may be used with the system in FIG. 15. The power divider 1620 may receive a first signal at a first terminal 1610 and a second signal at a second terminal 1612. The power divider 1620 may provide at least 20 dB of isolation between the first terminal 1610 and the second terminal 1620. The power divider 1620 may combine the first signal and second signal and provide an combined signal at a third terminal 1630. The power divider 1620 may be a Wilkinson power divider. For example, the power divider circuit may achieve isolation between the output ports while maintaining a matched condition on all ports. The power divider 1620 may use passive components allowing the power divider to also be used as a power combiner. The power divider 1620 may use quarter wave transformers, which can be easily fabricated as quarter wave lines on printed circuit boards. However in some implementations, the power divider may use other forms of transmission line (e.g. coaxial cable) or discrete circuit elements (e.g. inductors and capacitors).

The methods, devices, processors, modules, engines, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible. The first and second wireless couplers may be implemented using patch or slot antennas. Various slot configurations may be used. Additional configurations provided on the attached sheets and drawings may be used separately or combined with each other or aspects described in the paragraphs above.

The invention claimed is:

1. A system for radio frequency transmission in a vehicle, the system comprising: a transceiver generating a first radio-frequency signal and a second radio frequency signal, the first and second radio frequency signal having a frequency between the range of 5.70 and 5.95 GHz; a first wireless coupler attached to a first side of a window of the vehicle, the first wireless coupler comprising first conductive plate, a second conductive plate, and a first dielectric layer in a first sandwich structure, and the first wireless coupler being configured to receive or transmit the first and second radio frequency signals from the transceiver; a second wireless coupler attached to a second side of the glass window of the vehicle, the second wireless coupler the first wireless coupler comprising third conductive plate, a fourth conductive plate, and a second dielectric layer in a second sandwich structure, and the second wireless coupler being aligned with the first wireless coupler, the first wireless coupler being configured to transmit or receive the first and second radio frequency signals from the first wireless coupler to the second wireless coupler through the glass window; an antenna assembly electrically connected to the second wireless coupler, the antenna assembly comprising a first antenna and a second antenna, the first antenna and the second antenna being formed as traces printed on the same substrate, the first antenna comprising a first end placed adjacent to an end of the second antenna and a second end that extends away from the second antenna, wherein the first and second antennas are stub or mono-pole antennas and the first antenna has different transmission characteristics from the second antenna, and wherein the first antenna has a different omnidirectional radiation pattern without pain variations from the second antenna; and a power divider connected between the transmitter and the first wireless coupler, wherein the first radio frequency signal and the second radio frequency signal are combined by the power divider, the power divider being comprised of a first quarter wave transformer connected to the first radio frequency signal and a second quarter wave transformer connected to the second radio frequency signal.

2. The system according to claim 1, wherein the first wireless coupler includes a circuit to direct the first radio frequency signal to the first antenna and the second radio frequency signal to the second antenna.

3. The system according to claim 2, wherein the first antenna is isolated more than 50 mm from the second antenna.

4. The system according to claim 1, wherein the first antenna is mounted end to end with the second antenna.

5. The system according to claim 4, wherein the first antenna is mounted on the same substrate with the second antenna.

6. The system according to claim 4, wherein the first antenna is oriented along substantially the same axis the second antenna.

7. The system according to claim 1, wherein the first antenna has a different omnidirectional radiation pattern with gain variations from the second antenna.

8. The system according to claim 1, wherein the first radio frequency signal and the second radio frequency signal are transmitted through the antenna.

9. The system according to claim 8, wherein the power divider provides at least a 20 dB isolation between a first channel providing the first radio frequency signal and a second channel providing the second radio frequency signal.

10. The system according to claim 1, wherein the antenna is mounted to the second wireless coupler using a pivoting mechanism allowing the angle of the antenna to be oriented along a vertical axis of a vehicle.

11. The system according to claim 1, wherein the first antenna is formed of a series of radiating portions interspersed with non-radiating portions and the second antenna is formed of a series of radiating portions interspersed with non-radiating portions.

12. A system for radio frequency transmission of first and second radio frequency signals from a transceiver through a window, the first and second radio frequency signals being between the range of 5.70 and 5.95 GHz, the system comprising: a first wireless coupler attached to a first side of the window and configured to transmit or receive a first electro-magnetic waveform including the first radio frequency signal; a second wireless coupler attached to a second side of the window and aligned with the first wireless coupler, the first wireless coupler being configured to transmit or receive the first electro-magnetic waveform including the first radio frequency signal from the first wireless coupler to the second wireless coupler through the window; a first antenna electrically connected to the second wireless coupler; a third wireless coupler attached to the first side of the window and configured to transmit or receive a second electro-magnetic waveform including the second radio frequency signal; a fourth wireless coupler attached to a second side of the window and aligned with the third wireless coupler, the third wireless coupler being configured to transmit or receive the second electro-magnetic waveform including the second radio frequency signal from the third wireless coupler to the fourth wireless coupler through the window; a second antenna electrically connected to the fourth wireless coupler, the first antenna and the second antenna being formed as traces printed on the same substrate, the first antenna comprising a first end placed adjacent to an end of the second antenna and a second end that extends away from the second antenna; wherein the first and second antennas are stub or mono-pole antennas and the first antenna has different transmission characteristics from the second antenna, and wherein the first antenna has a different omnidirectional radiation pattern without gain variations from the second antenna; and a power divider connected between the transmitter and the first wireless coupler, wherein the first radio frequency signal and the second radio frequency signal are combined by the power divider, the power divider being comprised of a first quarter wave transformer connected to the first radio frequency signal and a second quarter wave transformer connected to the second radio frequency signal.

13. The system according to claim 12, wherein the first antenna is mounted end to end with the second antenna.

14. The system according to claim 12, wherein the first antenna is isolated more than 50 mm from the second antenna.

15. The system according to claim 12, wherein the antenna is mounted to the second wireless coupler using a pivoting mechanism allowing the angle of the antenna to be oriented along a vertical axis of a vehicle.

16. A system for radio frequency transmission of first and second radio frequency signals through a glass window, the system comprising: a first wireless coupler wherein the first wireless antenna is a patch antenna, the first wireless coupler being attached to a first side of the glass window and configured to transmit or receive the first and second radio frequency signals from the radio transceiver; a second wireless coupler wherein the second wireless antenna is a patch antenna, the second wireless coupler being attached to a second side of the glass window and aligned with the first wireless coupler, the first wireless coupler being configured to transmit or receive the first and second radio frequency signal from the first wireless coupler to the second wireless coupler through the glass window; a first antenna electrically connected to the second wireless coupler a second antenna electrically connected to the second wireless coupler, the first antenna and the second antenna being formed as traces printed on the same substrate, the first antenna having a first end being located proximate an end of the second antenna, the second antenna extending from the first end away from the first antenna, wherein the first and second antennas are stub or mono-pole antennas and the first antenna has different transmission characteristics from the second antenna, and wherein the first antenna has a different omnidirectional radiation pattern without gain variations from the second antenna; and a power divider connected between the transmitter and the first wireless coupler, wherein the first radio frequency signal and the second radio frequency signal are combined by the power divider, the power divider being comprised of a first quarter wave transformer connected to the first radio frequency signal and a second quarter wave transformer connected to the second radio frequency signal.

17. The system according to claim 16, wherein first antenna is substantially parallel to the second antenna.

18. The system according to claim 16, wherein radio frequency characteristics of the first and second antenna are configured to resonate at a frequency between the range of 5.70 and 5.95 GHz.

19. The system according to claim 16, wherein the antenna is mounted to the second wireless coupler using a pivoting mechanism allowing the angle of the antenna to be oriented along a vertical axis of a vehicle.

* * * * *